US007239273B2

(12) United States Patent
Jung et al.

(10) Patent No.: US 7,239,273 B2
(45) Date of Patent: Jul. 3, 2007

(54) APPARATUS AND METHOD FOR CALCULATING SATELLITE ACQUISITION INFORMATION TO RECOGNIZE POSITION OF MOBILE STATION

(75) Inventors: Jae-Young Jung, Seoul (KR); Eun-Tae Won, Seoul (KR); Dong-Jun Kum, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/776,319

(22) Filed: Feb. 12, 2004

(65) Prior Publication Data

US 2004/0160360 A1    Aug. 19, 2004

(30) Foreign Application Priority Data

Feb. 12, 2003    (KR) .................................. 2003-8932

(51) Int. Cl.
*G01S 5/14*    (2006.01)
(52) U.S. Cl. .............................. 342/357.15; 342/357.09
(58) Field of Classification Search ........... 342/357.15, 342/357.09
See application file for complete search history.

(56) References Cited

U.S. PATENT DOCUMENTS

| | | | | |
|---|---|---|---|---|
| 4,405,986 A | * | 9/1983 | Gray ........................... | 701/220 |
| 5,535,278 A | * | 7/1996 | Cahn et al. ............. | 342/357.12 |
| 6,016,117 A | * | 1/2000 | Nelson, Jr. ............. | 342/357.15 |
| 6,072,433 A | * | 6/2000 | Young et al. ........... | 342/357.08 |
| 6,084,544 A | * | 7/2000 | Camp, Jr. ............... | 342/357.15 |
| 6,147,641 A | * | 11/2000 | Issler .................... | 342/357.05 |
| 6,181,275 B1 | * | 1/2001 | Chenebault et al. ... | 342/357.05 |
| 6,411,892 B1 | * | 6/2002 | van Diggelen ......... | 342/357.09 |
| 6,429,811 B1 | * | 8/2002 | Zhao et al. ............. | 342/357.09 |
| 6,469,663 B1 | * | 10/2002 | Whitehead et al. ..... | 342/357.09 |
| 6,487,499 B1 | * | 11/2002 | Fuchs et al. ................. | 342/358 |
| 2004/0117114 A1 | * | 6/2004 | Diggelen ................ | 342/357.09 |
| 2004/0160360 A1 | * | 8/2004 | Jung et al. .............. | 342/357.15 |

OTHER PUBLICATIONS

R. Landry et al., Studies on Acquisitions and Tracking Threshold's Reduction for GPS Spaceborne and Aeronautical Receivers, ION GPS Conference, p. 619-628, 1998.*

(Continued)

*Primary Examiner*—Thomas H. Tarcza
*Assistant Examiner*—Fred H. Mull
(74) *Attorney, Agent, or Firm*—Roylance, Abrams, Berdo & Goodman, LLP

(57) ABSTRACT

An apparatus for calculating satellite acquisition information for controlling a position determination entity (PDE) to determine a position of the MS in a network assisted GPS system comprising an MS containing a GPS receiver and the PDE containing a reference station GPS receiver, the apparatus comprising a satellite data collector for collecting satellite orbital information transferred from a plurality of satellites to the reference station GPS receiver; a pseudo range calculator for receiving the satellites' position coordinates calculated based on the satellite orbital information and calculating a pseudo range between the MS and a satellite observed by the MS using the received information; a pseudo velocity calculator for receiving satellites' velocity information calculated based on the satellite orbital information; and a satellite acquisition information calculator for calculating a code phase using the pseudo range, calculating a Doppler shift using the pseudo velocity, and calculating the satellite acquisition information containing the code phase and the Doppler shift.

16 Claims, 11 Drawing Sheets

OTHER PUBLICATIONS

B. Lobert et al., Performance Of A Low Earth Orbit Navigation System: Error Model, Impact Of Doppler Measurements, Comparison With GPS And Application To Civil Aviation, ION GPS Conference, p. 2031-2041 1998.*

J. J. Spilker Jr., Global Positioning System: Theory and Applications, vol. I, edited by B.W. Parkinson et al., al., American Institute of Aeronautics and Astronautics, Inc., p. 138, 1996.*

E.D. Kaplan, Understanding GPS Principles and Applications, Artech House Publishers, p. 38, 1996.*

* cited by examiner

| | |
|---|---|
| PRN | PRN(Pseudo Random Noise) Code Number |
| M0 | Mean Anomaly at Reference Time |
| Deln | Mean Motion Difference from Computed Value |
| Ecc | Eccentricity |
| SqrtA | Square Root of the Semi-Major Axis |
| Omega0 | Longitude of Ascending Node of Orbit Plane at Weekly Epoc |
| Inc0 | Inclination Angle at Reference Time |
| w(Ω) | Argument of Perigee |
| Domega | Rate of Right Ascension |
| IDOT | Rate of Inclination Angle |
| Cuc | Amplitude of the Cosine Harmonic Correction Term to the Argument of Latitude |
| Cus | Amplitude of the Sine Harmonic Correction Term to the Argument of Latitude |
| Crc | Amplitude of the Cosine Harmonic Correction Term to the Orbit Radius |
| Crs | Amplitude of the Sine Harmonic Correction Term to the Orbit Radius |
| Cic | Amplitude of the Cosine Harmonic Correction Term to the Angle of inclination |
| Cis | Amplitude of the Sine Harmonic Correction Term to the Angle of Inclination |
| Toe | Reference Time Ephemeris |
| Tgd | Estimated Group Delay Differential |
| Toc | Clock Data Reference Time |
| af2 | Apparent Satellite Clock Correction af2 |
| af1 | Apparent Satellite Clock Correction af1 |
| af0 | Apparent Satellite Clock Correction af0 |

FIG.3 (PRIOR ART)

| PRN | PRN(Pseudo Random Noise) Code Number |
|---|---|
| SV_T0 | T0 |
| SV_X0 | X-COORDINATES AT T0 |
| SV_Y0 | Y-COORDINATES AT T0 |
| SV_Z0 | Z-COORDINATES AT T0 |
| PR_T0 | PSEUDO RANGE AT T0 |
| DO_T0 | DOPPLER AT T0 |
| SV_T1 | T1 |
| SV_X1 | X-COORDINATES AT T1 |
| SV_Y1 | Y-COORDINATES AT T1 |
| SV_Z1 | Z-COORDINATES AT T1 |
| PR_T1 | PSEUDO RANGE AT T1 |
| DO_T1 | DOPPLER AT T1 |
| SV_T2 | T2 |
| SV_X2 | X-COORDINATES AT T2 |
| SV_Y2 | Y-COORDINATES AT T2 |
| SV_Z2 | Z-COORDINATES AT T2 |
| PR_T2 | PSEUDO RANGE AT T2 |
| DO_T2 | DOPPLER AT T2 |

FIG.6

| PRN | 21 |
|---|---|
| Time_Of_App | 275348.00 |
| Pseudo Range | 24010378.558 |
| Doppler 0 | 1267 |

FIG.10

| CLASSIFICATION | PRIOR ART | PRESENT INVENTION | NOTES |
|---|---|---|---|
| ●THE NUMBER OF MANAGEMENT DATA ITEMS | 22 | 19 | REDUCTION OF ABOUT 14% |
| ● Pseudo Range [PR] (meter) | 24010434.160 | 24010399.837 | |
| ESTIMATED PR - OBSERVED PR | 55.602 | 21.279 | |
| MEAN ERROR (VALUE AVERAGED 1000 TIMES) | 37.480 | 7.709 | ALMOST THE SAME IN 1 CHIP (ERROR REDUCTION OF ABOUT 79%) |
| ● CODE_PH (chip) | 92 | 92 | |
| ● CODE_PH_INT (CA Code Period) | 19 | 19 | |
| ●DOPPLER_0 [D0] (2.5Hz) | 1267 | 1267 | |
| ESTIMATED PD0 - OBSERVED D0 | 0 | 0 | |
| MEAN ERROR (VALUE AVERAGED 1000 TIMES) | 0.1 | 0.4 | ALMOST THE SAME IN 1 CHIP (MAXIMUM ERROR = 1) |
| ●DOPPLER_1 (1/64 Hz/s) | 128 | 128 | |
| ●PROCESSING TIME (MS : TIME ACCUMULATED 10000 TIMES) | 76 | 14 | REDUCTION OF ABOUT 82% |

| PRIOR ART | | PRESENT INVENTION | |
|---|---|---|---|
| PRN = 21; | | PRN = 21; | |
| TGD | = -0.0000000023283064365; | SVInfo.SV1_Sec | = 275340.00; |
| toc | = 280800.0000000000000000000; | SVInfo.SV1_X | = 11404031.831; |
| af2 | = 0.0000000000000000000000; | SVInfo.SV1_Y | = 12298426.774; |
| af1 | = -0.000000000000022737368; | SVInfo.SV1_Z | = 21166360.462; |
| af0 | = -0.000002787448465824413; | SVInfo.SV1_PR | = 24030158.523; |
| Crs | = -42.71875000000000000000; | SVInfo.SV1_Dopp0 | = 3171.927; |
| DELn | = 0.000000003780157745873; | | |
| M0 | = -1.907917992031140700000; | SVInfo.SV2_Sec | = 275341.00; |
| Cuc | = -0.000002289190888408485; | SVInfo.SV2_X | = 11401512.784; |
| e | = 0.018450978212058544000; | SVInfo.SV2_Y | = 12298934.393; |
| Cus | = 0.000009926036000025177; | SVInfo.SV2_Z | = 21167385.153; |
| SQRTA | = 5153.691301345825200000; | SVInfo.SV2_PR | = 24029555.159; |
| toe | = 280800.0000000000000000000; | SVInfo.SV2_Dopp0 | = 3172.012; |
| Cic | = 0.000000180676574940; | | |
| OMEGA0 | = 1.043242208159731580000; | SVInfo.SV3_Sec | = 275342.00; |
| Cis | = -0.000000244006514549262; | SVInfo.SV3_X | = 11398993.640; |
| i0 | = 0.980253308559230665000; | SVInfo.SV3_Y | = 12299442.197; |
| Crc | = 197.21875000000000000000; | SVInfo.SV3_Z | = 21168409.416; |
| omega | = -2.330321006515036600000; | SVInfo.SV3_PR | = 24028951.724; |
| OMEGADOT | = -0.000000007504241153199; | SVInfo.SV3_Dopp0 | = 3172.137; |
| IDOT | = 0.000000000417874540; | | |

☞ PDE COORDINATES = { -3062720.447, 4056575.507, 3840282.929};
☞ BTS COORDINATES = { -3050861.926, 4053859.149, 3852320.821};

APPARATUS AND METHOD FOR CALCULATING SATELLITE ACQUISITION INFORMATION TO RECOGNIZE POSITION OF MOBILE STATION

PRIORITY

This application claims priority to an application entitled "APPARATUS AND METHOD FOR CALCULATING SATELLITE ACQUISITION INFORMATION TO RECOGNIZE POSITION OF MOBILE STATION", filed in the Korean Intellectual Property Office on Feb. 12, 2003 and assigned Ser. No. 2003-8932, the contents of which are hereby incorporated by reference.

BACKGROUND OF THE INVENTION

1. Field of the Invention

The present invention relates to an apparatus and method for recognizing position information of a mobile station (MS) (i.e., a mobile terminal) in a mobile communication system, and more particularly to an apparatus and method for calculating satellite acquisition information to detect position information of the MS in a Network Assisted GPS (Global Positioning System).

2. Description of the Related Art

Generally, technologies for determining a position of a target object (e.g., an MS) using a GPS satellite have been widely used in a variety of applications, for example, navigation systems for vehicles or ships. A GPS receiver for use in the above technologies receives a plurality of satellite signals containing satellite position coordinate information from a satellite, and detects a pseudo range between the satellite and the GPS receiver, such that it can calculate its own current position using the pseudo range and the satellite position coordinate. A conventional GPS receiver independently calculates position information of a target object without communicating with an external device. These conventional GPS receivers, therefore operate in what has generally been called a standalone GPS scheme. Most GPS receivers have generally used the stand-alone GPS scheme.

There has recently been proposed a method for embedding the GPS receiver in the MS. However, a battery built in the MS has a limited amount of available electric energy, such that the GPS receiver built in the MS is designed to be operated only in the specific case where a position determination operation is requested. It takes a long period of time for the built-in GPS receiver to make a position determination once an MS's position measurement request has been made. As a result, the GPS receiver built into the MS it cannot immediately provide a user with current position information upon receiving the position measurement request from the user.

In order to solve the aforementioned problems, there has recently developed a network assisted GPS system. This network assisted GPS system has a GPS receiver installed (hereinafter referred to as a reference station GPS receiver) at a fixed position, such that it can always receive a satellite signal containing specific information of a satellite via the reference station GPS receiver. Upon receiving a position measurement request signal from the MS, the network assisted GPS system transmits specific information collected by the reference station GPS receiver to the MS, such that the MS can calculate its own position using the received information within a short period of time (e.g., 10 seconds).

There are three components of the information transferred from the network assisted GPS system to the MS. These include an observable GPS satellite number (e.g., a GPS satellite's pseudo random number (PRN), code phase and pseudo range search window (PRSW) information. The PRSW information corresponds to pseudo range information of individual GPS satellites, Doppler frequency and frequency search window (FSW) information corresponding to velocity information of individual GPS satellites.

Information applied to the MS is called satellite acquisition information. The satellite acquisition information can be acquired by processing an output signal of the reference station GPS receiver. A device for acquiring the satellite acquisition information is called a position determination entity (PDE).

The Network Assisted GPS system is shown in FIG. 1.

Referring to FIG. 1, an MS (Mobile Station) 100 can wirelessly communicate with a mobile communication base station (hereinafter referred to as an BS) 110, and can calculate its own position because it contains a GPS receiver. The PDE 120 can communicate with the BS 110, and includes a reference station GPS receiver 130. Although the PDE 120 is connected to the BS 110 in FIG. 1, it may also be connected to an mobile switching center (MSC). The BS 110 is composed of a base station transceiver subsystem (BTS) and a base station controller (BSC). It is assumed that the PDE 120 is connected to the BSC contained in the BS 110 in FIG. 1.

FIG. 2 is a conceptual diagram illustrating operations of the network assisted GPS system shown in FIG. 1.

Referring to FIGS. 1 and 2, if a user selects a position measurement command by pressing a predetermined button of the MS to recognize the user's position information, the MS 100 recognizes the user's position measurement command at step 200, and requests satellite acquisition information from a corresponding BS 110 at step 210. The BS 110 informs the PDE 120 of the fact that the MS 100 has requested satellite acquisition information at step 220.

Upon receiving the satellite acquisition information request signal (step 220), the PDE receives GPS satellite orbital information from the reference station GPS receiver 130 at step 230. The PDE 120 calculates satellite acquisition information to be applied to the MS 100 upon receiving the GPS satellite orbital information from the reference station GPS receiver at step 240. The PDE 120 transmits the calculated satellite acquisition information to the BS 110 at step 250. The BS 110 transmits the received satellite acquisition information to the MS 100 at step 260.

The network assisted GPS system has been estimated to be the most effective system capable of providing position information of the MS, and has already been standardized. A representative example of the network assisted GPS system has been disclosed in a Telecommunications Industry Association paper, entitled "Position Determination Service Standard for Dual-Mode Spread Spectrum Systems", TIAIELA/Interim Standard 801(IS-801), the entire contents of which are herein incorporated by reference, by inventor Lake Louise in the province of Alberta, Canada on October 1999. Another example thereof has also been disclosed in a Telecommunications Industry Association paper, entitled "Enhanced Wireless PN-3890 911 Phase 2", the entire contents of which are herein incorporated by reference, which has been published as J-STD-xxx in February, 2000. Most mobile communication service providers currently attempt to adapt the network assisted GPS system as an MS position determination system.

In the above-described network assisted GPS system, the PDE 120 always receives satellite orbital information from the reference station GPS receiver 130, and transmits satellite acquisition information calculated by the received satellite orbital information to the MS 100 upon receiving a request from the MS 100.

The satellite acquisition information transferred to the MS 100 is calculated based on the MS 100's estimated GPS signal search time (Ta) for determining a position of the MS 100, instead of using satellite orbital information transferred from the reference station GPS receiver 130 to the PDE 120 at a current time (Tc). Particularly, there is variation in code phase and Doppler shift information contained in the satellite acquisition information due to the movement of satellites with the lapse of time. Therefore, the code phase and Doppler phase of individual satellites must be calculated considering the time Ta at which the MS 100 searches for the GPS signal to recognize its position. In this case, the code phase is equal to a phase difference between the satellite and the MS 100 at the time Ta, and is calculated by a pseudo range between the MS 100 and the GPS satellite. The Doppler shift is equal to a frequency variation of the moving satellite.

The PDE 120 calculates position and velocity information of the satellite using satellite orbital information received from the reference station GPS 130 in such a way that it can calculate the code phase and the Doppler shift. In this case, the code phase is calculated using the satellite's position information, and the Doppler shift information is calculated using the satellite's velocity information. A representative example for controlling the PDE 120 to calculate the position and velocity information of the satellite has been disclosed in GPS standard positioning system (SPS) Signal Specification (2nd Edition, 2 Jun. 1995), the entire contents of which are hereby incorporated by reference.

The satellite position information can be calculated using the following Equation 1:

$$x_k = x_p \cos \Omega_k - y_p \cos i_k \sin \Omega_k$$

$$y_k = x_p \sin \Omega_k + y_p \cos i_k \cos \Omega_k$$

$$z_k = y_p \sin i_k \quad \text{[Equation 1]}$$

where $(x_k, y_k, z_k)$ is position coordinate information of a k-th satellite, $x_k$ is an Earth-Centered, Earth-Fixed (ECEF) X-axis coordinate after the lapse of a predetermined time $t_k$ indicative of time variance, $y_k$ is a ECEF Y-axis coordinate after the lapse of $t_k$, $z_k$ is a ECEF Z-axis coordinate after the lapse of $t_k$, $x_p$ is a satellite position in an orbital plane, $y_p$ is a satellite position in an orbital plane, $\Omega$ is an argument of perigee, and $i_k$ is a variation in inclination angle of a satellite orbit after the lapse of $t_k$.

The satellite time can be corrected using the following Equation 2:

$$\Delta t_{sv} = a_{f0} + a_{f1} t_c + a_{f2} t_c^2 + \Delta t_r - T_{GD} \quad \text{[Equation 2]}$$

where $\Delta t_{sv}$ is a time difference between the satellite and the MS, $T_{GD}$ is an estimated group delay difference, $\Delta t_r$ is a relative correction time, and $a_{f0} \sim a_{f2}$ are identifiable satellite clock correlation values.

A satellite's velocity can be calculated using the following Equation 3:

$$v_x = -\Omega_k' y_k + \sin \Omega_k (z_k i_k' - y_p' \cos i_k) + x_p' \cos \Omega_k$$

$$v_y = \Omega_k' x_k + \cos \Omega_k (-z_k i_k' + y_p' \cos i_k) + x_p' \sin \Omega_k$$

$$v_z = y_p i_k' \cos i_k + y_p' \sin i_k \quad \text{[Equation 3]}$$

where $v_x$ is a velocity component in the X-axis direction, $v_y$ is a velocity component in the Y-axis direction, and $v_z$ is a velocity component in the Z-axis direction.

A satellite's acceleration can be calculated using the following Equation 4:

$$a_x = -\Omega_k' y_k' + \sin \Omega_k (z_k' i_k' - \Omega_k' x_p' + y_p i_k'' \sin i_k - y_p'' \cos i_k + i_k' y_p' \sin i_k) + \cos \Omega_k (x_p'' + y_p \Omega_k' i_k' \sin i_k - \Omega_k' y_p' \cos i_k)$$

$$a_y = \Omega_k' x_k' + \cos \Omega_k (-z_k' i_k' + \Omega_k' x_p' - y_p i_k'' \sin i_k + y_p'' \cos i_k - i_k' y_p' \sin i_k) + \sin \Omega_k (x_p'' + y_p \Omega_k' i_k' \sin i_k - \Omega_k' y_p' \cos i_k)$$

$$a_z = \sin i_k (-y_p i_k'^2 + y_p'') = \cos i_k (y_p i_k'' + 2 i_k' y_p') \quad \text{[Equation 4]}$$

where $a_x$ is an X-axis acceleration component of the satellite, $a_y$ is a Y-axis acceleration component of the satellite, and $a_z$ is a Z-axis acceleration component of the satellite.

FIG. 3 depicts general satellite orbital information items to be managed by the PDE to calculate position and velocity information of the satellite. In order to Calculate the position and velocity information of the satellite, the PDE 120 must unavoidably manage a large amount of satellite orbital information shown in FIG. 3 in association with individual observable satellites, resulting in an ineffective system.

A method for calculating the Doppler shift and the code phase will hereinafter be described with reference to FIGS. 1 to 3. A pseudo range $\rho$ between the satellite and the MS is calculated to calculate the code phase. The pseudo range $\rho$ between the satellite and the MS can be calculated by substituting a position coordinate of the satellite and a coordinate of the MS into the following Equation 5:

$$\rho = \sqrt{(x_k - x)^2 + (y_k - y)^2 + (z_k - z)^2} - c \Delta t_{sv} \quad \text{[Equation 5]}$$

where $(x, y, z)$ is coordinate information of a BS communicating with the MS, and $(x_k, y_k, z_k)$ is satellite coordinate information calculated by Equation 1. In greater detail, it may be considered that the position of the MS is almost equal to that of the BS 110 communicating with the MS from the viewpoint of the satellite. Therefore, coordinate information of the MS is replaced with the other coordinate information $(x, y, z)$ of a corresponding BS 110 so that a pseudo range can be calculated. The second term of the Equation 5 is adapted to correct the time difference $\Delta t_{sv}$ between the satellite and the MS, and the reference character "c" of the Equation 5 is the velocity of light.

The code phase to be calculated using satellite acquisition information is a parameter associated with time. The calculated pseudo range relates to a range (i.e., a distance), such that the code phase can be calculated on the condition that the calculated pseudo range is converted into time-dependent information (i.e., time-unit information). Therefore, the code phase can be represented by the following Equation 6:

$$SV\_CODE\_PH = \text{floor}((\rho/c) * 1000 - t) * 1023);$$

$$t = \text{floor}((\rho/C) * 1000) \quad \text{[Equation 6]}$$

where floor(x) is a function indicative of the highest integer of less than a real number x, SV_CODE_PH is a code phase between the satellite and the MS, and "t" is a specific value acquired by converting a pseudo range into a time-unit value.

The Doppler shift information is calculated using the velocity of the satellite. Doppler effect phenomenon is a specific state during which a frequency of a radio signal transmitted from a transmitter is different from that of a radio signal received in a receiver due to the movement of the transmitter and the receiver. A Doppler value transferred from the PDE to the MS as satellite acquisition information is called a pseudo Doppler value $\tilde{d}$. The pseudo Doppler value can be calculated using the following Equation 7:

$$\tilde{d} = d - \Delta f_T + \Delta f_R = -f_T \frac{1}{c}|r|' - \Delta f_T + \Delta f_R \quad \text{[Equation 7]}$$
$$= -f_T \frac{1}{c}(v - u') \cdot \frac{r}{|r|} - \Delta f_T + \Delta f_R$$

where d is a Doppler value, $\tilde{d}$ is acquired by correcting the Doppler value d using an error value $\Delta f_T - \Delta f_R$, $\Delta f_T$ is a variation in frequency of a satellite signal transferred from the satellite, $\Delta f_R$ is a variation in frequency of a satellite signal received in the MS, v is a vector of a satellite velocity $(v_x, v_y, v_z)$ a is a vector of a satellite acceleration $(a_x, a_y, a_z)$, u is a vector of an MS position (x, y, z), u' is a velocity vector of the MS, and r is a difference between the satellite position vector $(x_k, y_k, z_k)$ and the MS position vector (x, y, z). Provided that the MS enters a halt state and is minimally affected by $\Delta f_T$ and $\Delta f_R$, the above Equation 7 can be represented by the following Equation 8:

$$\tilde{d} \approx -f_{T0} \frac{1}{c} v \cdot \frac{r}{|r|} \quad \text{[Equation 8]}$$
$$= -\frac{1}{\lambda} \frac{v_x(x_k - x) + v_y(y_k - y) + v_z(z_k - z)}{\sqrt{(x_k - x)^2 + (y_k - y)^2 + (z_k - z)^2}}$$

The Doppler shift indicative of a variation in wavelength (i.e., frequency) created by the satellite's movement while orbiting the earth can be calculated using the following Equation 9:

$$\tilde{d}' \approx -f_{T0} \frac{1}{c} \frac{(a \cdot r + |v|^2)|r|^2 - (v \cdot r)^2}{|r|^3} \quad \text{[Equation 9]}$$
$$\tilde{d}' \approx -\frac{1}{\lambda} \frac{1}{((x_k - x)^2 + (y_k - y)^2 + (z_k - z)^2)^{\frac{3}{2}}}$$
$$\{(a_x(x_k - x) + a_y(y_k - y) +$$
$$a_z(z_k - z) + v_x^2 + v_y^2 + v_z^2)$$
$$((x_k - x)^2 + (y_k - y)^2 + (z_k - z)^2) -$$
$$(v_x(x_k - x) + v_y(y_k - y) + v_z(z_k - z))^2\}$$

where $(x_k, y_k, z_k)$ is position coordinate information of the satellite, (x, y, z) is coordinate information of the BS 110, $(a_x, a_y, a_z)$ is an acceleration of the satellite, and $(v_x, v_y, v_z)$ is a velocity vector of the satellite.

There may arise an unexpected propagation delay, however, of a satellite signal while the satellite signal passes through the ionosphere and the troposphere before reaching the MS. The conventional method described above for calculating satellite acquisition information denoted by the aforementioned equations has not compensated for the propagation delay, and has calculated the code phase and Doppler shift information on the basis of a real range between the satellite and the BS 110 (i.e., a transmission range in an ideal state). Therefore, the conventional method has a disadvantage in that the calculated code phase and Doppler shift information may be different from those of a satellite actually observable by the MS.

SUMMARY OF THE INVENTION

Therefore, the present invention has been made in view of the above problems, and it is an object of the present invention to provide an apparatus and method for calculating satellite acquisition information to determine an mobile station (MS) position in a mobile communication system based on a network assisted GPS scheme.

It is another object of the present invention to provide an apparatus and method for calculating satellite acquisition information using range or distance information between the satellite and the BS to determine an MS position in a mobile communication system based on a network assisted GPS scheme.

It is yet another object of the present invention to provide an apparatus and method for compensating for a propagation delay of a satellite signal communicated between the satellite and the MS in a mobile communication system based on a network assisted GPS scheme, such that it can determine a position of the MS.

In accordance with one aspect of the present invention, the above and other objects can be accomplished by the provision of an apparatus for calculating satellite acquisition information for controlling a position determination entity (PDE) to determine a position of an mobile station (MS) in a network assisted GPS system composed of the MS containing a GPS receiver and the PDE containing a reference station GPS receiver, comprising a satellite data collector for collecting satellite orbital information transferred from a plurality of satellites to the reference station GPS receiver, and storing satellite orbital information of more than three consecutive times T0~T2 of the satellites, a pseudo range calculator for receiving the satellites' position coordinates calculated based on the satellite orbital information of more than three consecutive times T0~T2 and position coordinates of a base station (BS) communicating with the MS, and calculating a pseudo range between the MS and a satellite observed by the MS using the received information, and a pseudo velocity calculator for receiving satellites' velocity information calculated based on the satellite orbital information of more than three consecutive times T0~T2, and calculating pseudo velocities between the satellite observed by the MS and the MS at a position measurement time of the MS using the received information. The apparatus for calculating satellite acquisition information further comprises a satellite acquisition information calculator for calculating a code phase using the pseudo range, calculating a Doppler shift using the pseudo velocity, and calculating the satellite acquisition information containing the code phase and the Doppler shift.

In accordance with another aspect of the present invention, there is provided a method for calculating satellite acquisition information for controlling a position determination entity (PDE) to determine a position of an mobile station (MS) in a Network Assisted GPS system composed of the MS containing a GPS receiver and the PDE containing a reference station GPS receiver, comprising the steps of collecting satellite orbital information transferred from a plurality of satellites to the reference station GPS receiver, and storing satellite orbital information of more than three consecutive times T0, T1, and T2 of the satellites, receiving the satellites' position coordinates calculated based on the satellite orbital information of more than three consecutive times T0, T1, and T2 and position coordinates of a base station (BS) communicating with the MS, and calculating a pseudo range between the MS and a satellite observed by the MS using the received information, and receiving satellites' velocity information calculated based on the satellite orbital information of more than three consecutive times T0, T1, and T2 calculating pseudo velocities between the satellite observed by the MS and the MS at a position measurement time of the MS using the received information. The method for calculating satellite acquisition information further comprises calculating a code phase using the pseudo range, calculating a Doppler shift using the pseudo velocity, and acquiring the satellite acquisition information containing the code phase and the Doppler shift.

BRIEF DESCRIPTION OF THE DRAWINGS

The above and other objects, features and other advantages of the present invention will be more clearly understood from the following detailed description taken in conjunction with the accompanying drawings, in which:

FIG. 3 shows satellite orbital information items managed by a PDE to calculate position and velocity information of a satellite;

FIG. 6 shows a variety of abbreviations in accordance with a preferred embodiment of the present invention;

FIGS. 10~12 are tables illustrating the comparison results between a simulation result of the present invention and the prior art.

DETAILED DESCRIPTION OF THE PREFERRED EMBODIMENTS

Figure 1:
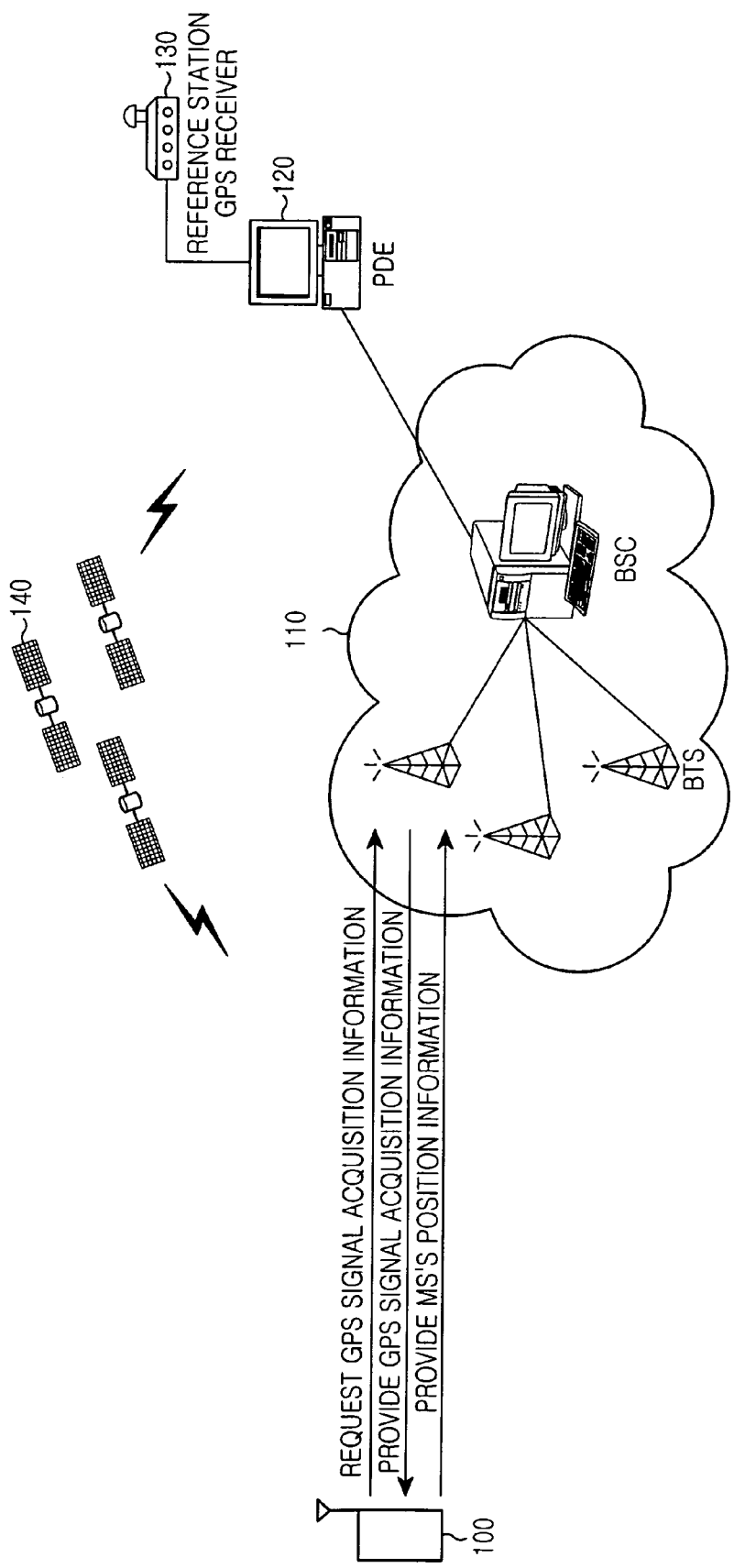
FIG. 1 is a block diagram illustrating a conventional mobile communication system using a network assisted GPS scheme.
Figure 2:
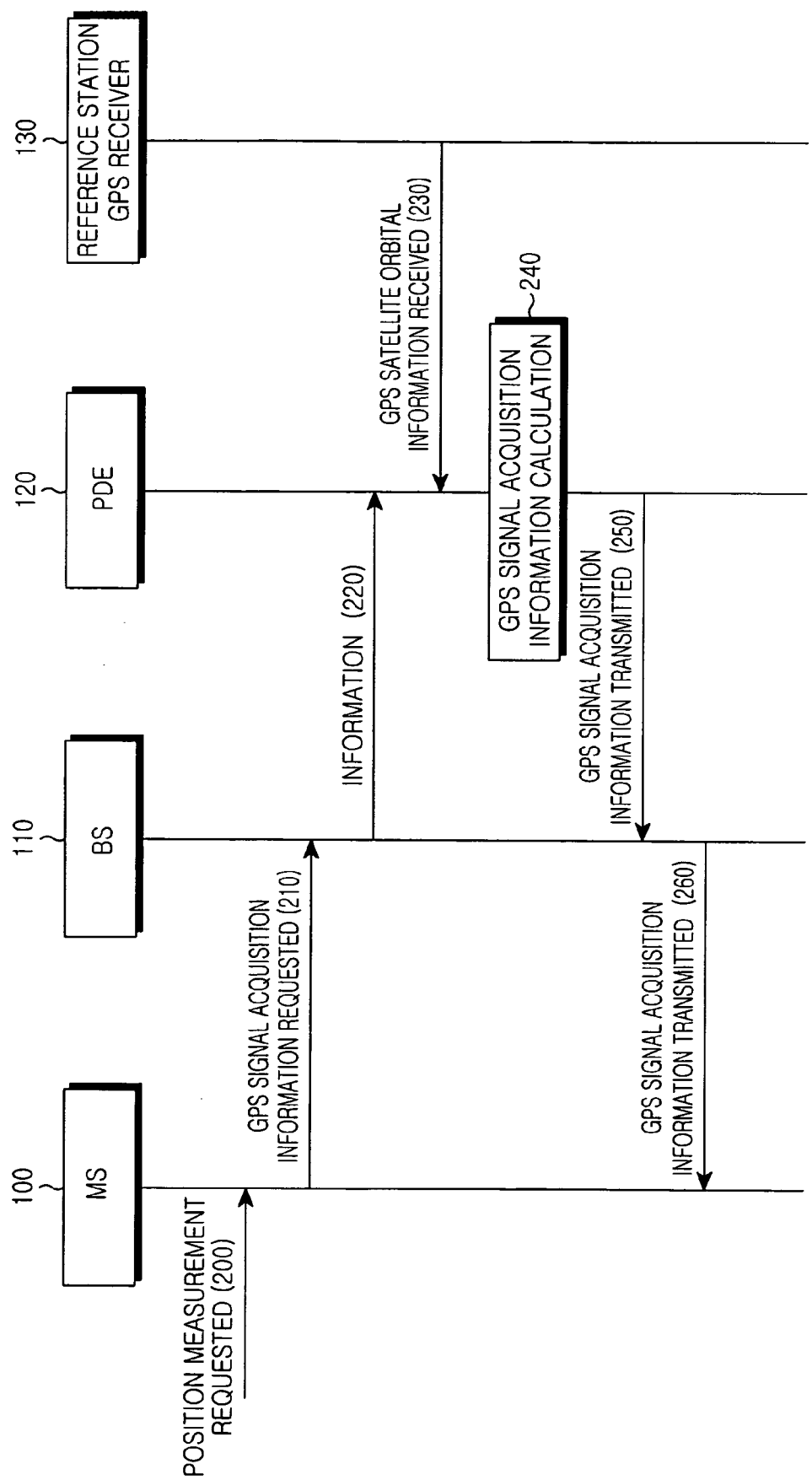
FIG. 2 is a flow chart illustrating conventional operations of the mobile communication system using the network assisted GPS scheme.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

The present invention is designed to calculate acquisition information for determining an MS position in a mobile communication system based on a network assisted GPS scheme. In more detail, the present invention calculates position and velocity information of new or future satellites simultaneously with managing a small amount of data associated with old satellites, and calculates code phase and Doppler shift information of a specific satellite to be actually observed by the MS at a GPS signal search time (Ta) of the MS.

Figure 4:
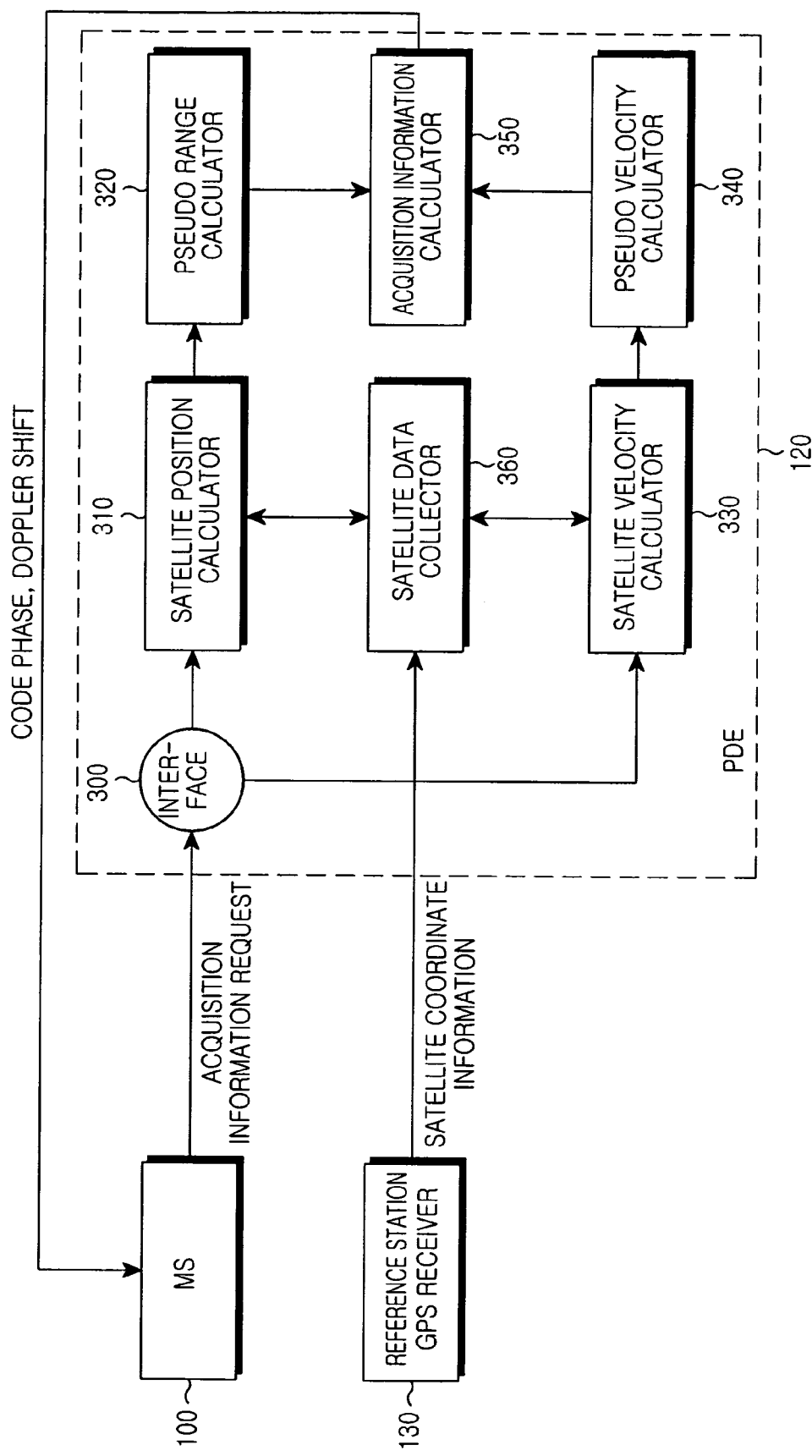
FIG. 4 is a block diagram illustrating a PDE in accordance with a preferred embodiment of the present invention.

FIG. 4 is a block diagram illustrating a PDE in accordance with a preferred embodiment of the present invention. A method for calculating satellite acquisition information (e.g., code phase and Doppler shift information) for controlling the PDE 120 to determine position information of the MS 100 will hereinafter be described with reference to FIGS. 1 to 4.

The reference station GPS receiver 130 outputs satellite coordinates, coordinate extraction times, and pseudo ranges of observable satellites every second.

The PDE 120 receives satellite coordinate information from the reference station GPS receiver 130, and transmits code phase and Doppler shift information upon receiving an acquisition information request from the MS 100. The PDE 120 includes an interface 300, a satellite position calculator 310, a pseudo range calculator 320, a satellite velocity calculator 330, a pseudo velocity calculator 340, a satellite data collector 360, and an acquisition information calculator 350.

The satellite data collector 360 selects more than three recent-consecutive satellite orbital information blocks of individual satellites from among satellite coordinate information generated from the reference station GPS receiver 130 in units of seconds, collects the selected satellite orbital information, and stores it.

Upon receiving a request message from the MS 100, the interface 300 requests that the satellite position calculator 310 and the satellite velocity calculator 330 calculate satellite acquisition information. The satellite position calculator 310 calculates satellite position information using satellite orbital information stored in the satellite data collector 360, and transmits the calculated result to the pseudo range calculator 320. The pseudo range calculator 320 calculates a pseudo range considering a propagation delay between the BS 110 and the satellite using the calculated satellite position information.

The satellite velocity calculator 330 calculates satellite velocity information using satellite data stored in the satellite data collector 360, and transmits the calculated result to the pseudo velocity calculator 340. The pseudo velocity calculator 340 calculates a pseudo velocity considering the propagation delay between the satellite and the MS 100 using satellite velocity information.

The satellite acquisition information calculator 350 calculates a code phase using a pseudo range received from the pseudo range calculator 320. The satellite acquisition information calculator 350 calculates Doppler shift information using pseudo velocity information received from the pseudo velocity calculator 340, and transmits the calculated Doppler shift information to the MS 100.

As well known by those skilled in the art, the Doppler effect indicates a specific state during which there arises a slight difference in frequency observed by a receiver user due to a velocity difference between the transmitter user and the receiver user. The satellite moves at a high speed of about 3.8 km per second, such that there is a slight difference in frequency (about 1.57 GHz) of a transmission signal of the satellite according to the relative position of a satellite observer. Unless such a frequency difference is correctly transmitted to the observer, the observer requires a long period of time to find the frequency of a corresponding satellite. There is a need for a position determination service to be completed within a short period of time, such that the PDE 120 must transmit correct information indicative of the satellite signal frequency variation to minimize the search time of the GPS receiver built in the MS.

However, there arise a variety of unexpected delay components between the estimation calculation time of the PDE 120 and the position measurement time of the MS 100. These delay components include, for example, a processing time of the PDE, a wireless communication delay, and a processing time of the MS, among others. Therefore, there always arises a slight difference between the true satellite signal reception time of the MS 100 and the other time at which the PDE 120 expects the MS 100 to receive the satellite signal. In order to correct this time difference, the PDE 120 transmits reference time data and a time-dependent variation to the MS.

In this case, the frequency of the satellite is correctly fixed to a specific value, such that the PDE 120 transmits a difference between the frequency variation generated at an estimated time and the time-dependent frequency variation to the MS 100. Provided that the frequency variation linearly varies with time, the PDE 120 transmits a first-order differential value and a second-order differential value of the frequency variation curve to the MS 100. The MS 100 receives the first-order and second-order differential values from the PDE 120, firstly adds the multiplied result of the first-order differential value and a satellite's running time to the fixed satellite frequency, and adds the sum of squares of the second-order differential value and the satellite's running time to the firstly-added result, resulting in a final frequency.

In this case, the frequency variation at a reception estimation time of the MS (i.e., the first-order differential value of the time-dependent frequency variation curve) is called a "Doppler0", and a time-dependent variation of the Doppler0 (i.e., the second-order differential value of the time-dependent frequency variation curve) is called a "Doppler1".

Figure 5:
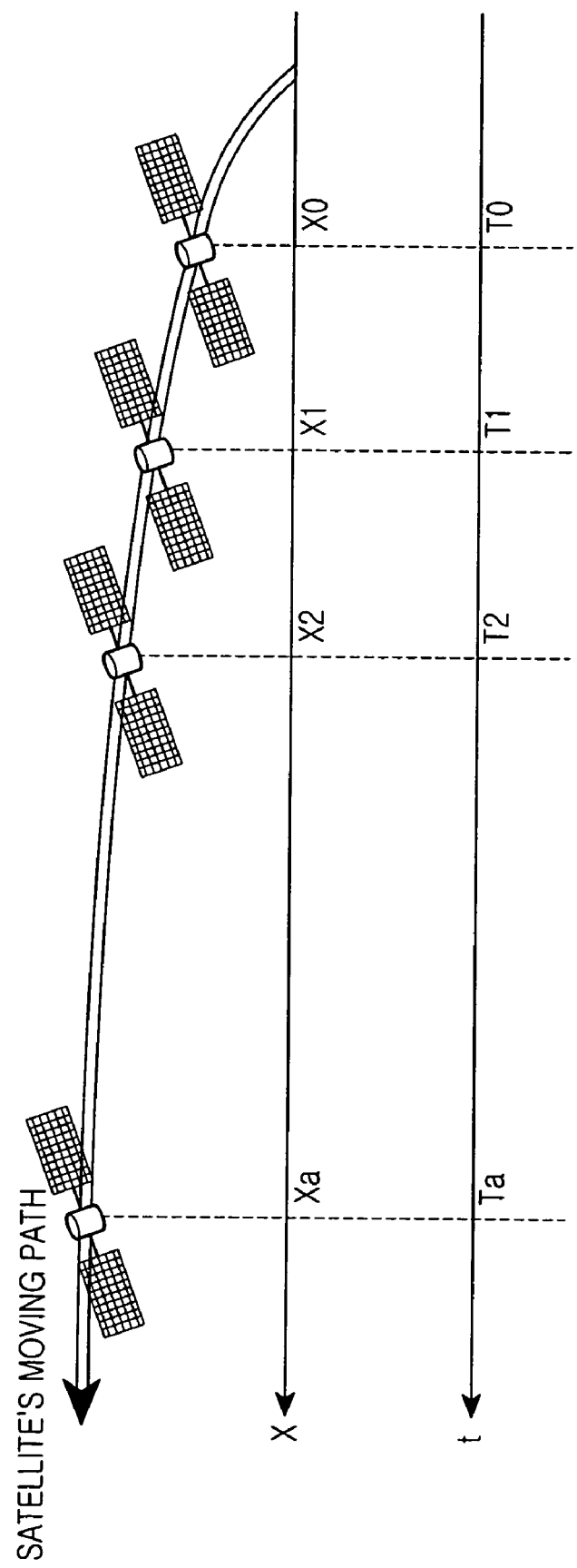
FIG. 5 is a view illustrating X coordinates of a satellite for every time period in accordance with a preferred embodiment of the present invention.

FIG. 5 is a view illustrating the movement of the satellite for every time period, i.e., X-coordinates of the satellite for every time period.

Referring to FIG. 5, the reference station GPS receiver 130 receives coordinate information and coordinate extraction time of individual observable satellites per second, and stores the received information in the satellite data collector 360. For example, the satellite data collector 360 stores data at a variety of times T0, T1, and T2. In this case, T2 is a Tc time, T1 is a time one second prior, and T0 is a time two seconds prior.

If the interface 300 receives a satellite acquisition information request signal from the MS 100, the satellite position calculator 310 and the satellite velocity calculator 330 can easily calculate satellite coordinate and velocity information estimated at Ta using satellite coordinate and time data of three recent-consecutive times. In this case, Ta is a specific time at which the MS 100 searches for a GPS signal to determine its own position using an interpolation method. Although FIG. 5 has disclosed only the X-axis for the convenience of description, it should be noted that the aforementioned operations may also be applied to the remaining Y-axis and Z-axis if needed.

The satellite position $X_a$ at the time Ta can be acquired by multiplying a satellite running time by the satellite velocity $V_x$ and acceleration $A_x$ and adding the multiplied result to a position X1 having been detected one second prior by the satellite. A method for calculating the satellite velocity $V_x$ and acceleration Ax and the satellite position $X_a$ detected at Ta at which the MS 100 expects to search for the satellite signal can be represented by the following Equation 10:

$$V_X = (X2 - X0)/(T2 - T0)$$ [Equation 10]

$$A_X = \frac{(X2 - X1)/(T2 - T1) - (X1 - X0)/(T1 - T0)}{T1 - T0}$$

$$V_{Xa} = VX2 + (VX2 - VX1)/(T2 - T1) * (Ta - T2)$$

where X2 is a satellite position at the current time T2, X1 is a satellite position at T1 (i.e., a time one second prior), and X0 is a satellite position at T0 (i.e., a time two seconds prior).

A method for calculating a first satellite velocity $V_{x1}$ at T1, a second satellite velocity $V_{x2}$ at T2, and a third satellite velocity $V_{xa}$ at Ta can be represented by the following Equation 11:

$$V_{x1} = (X1 - X0)/(T1 - T0)$$

$$V_{x2} = (X2 - X1)/(T2 - T1)$$

$$V_{xa} = VX2 + (VX2 - VX1)/(T2 - T1) * (Ta - T2)$$ [Equation 11]

However, the propagation delay created while the satellite signal passes through the ionosphere and the troposphere before reaching the MS 100 cannot be calculated correctly The thicker the ionosphere, the longer the propagation time between the satellite and the reference station GPS receiver 130. The higher the instability of the troposphere, the longer the propagation time between the satellite and the reference station GPS receiver 130. Because of these aforementioned delays, the absolute error of observed data increases, such that the satellite signal delay must be compensated at a time close to the time Ta at which the MS 100 expects to search for the satellite signal. The embodiments of present invention replaces the compensated value with a specific value having been observed by the reference station GPS receiver 130 at the current time Tc in such a way that it compensates for the satellite signal delay.

In this case, the PDE must recognize an approximate position of the MS 100 to estimate a pseudo range. It cannot correctly recognize a current position of the MS 100. It can be considered that the MS 100's position is almost equal to the BS 110's position from the viewpoint of the satellite, such that the MS 100's coordinates can be replaced with the BS 110's coordinates using the following equations.

Figure 7:
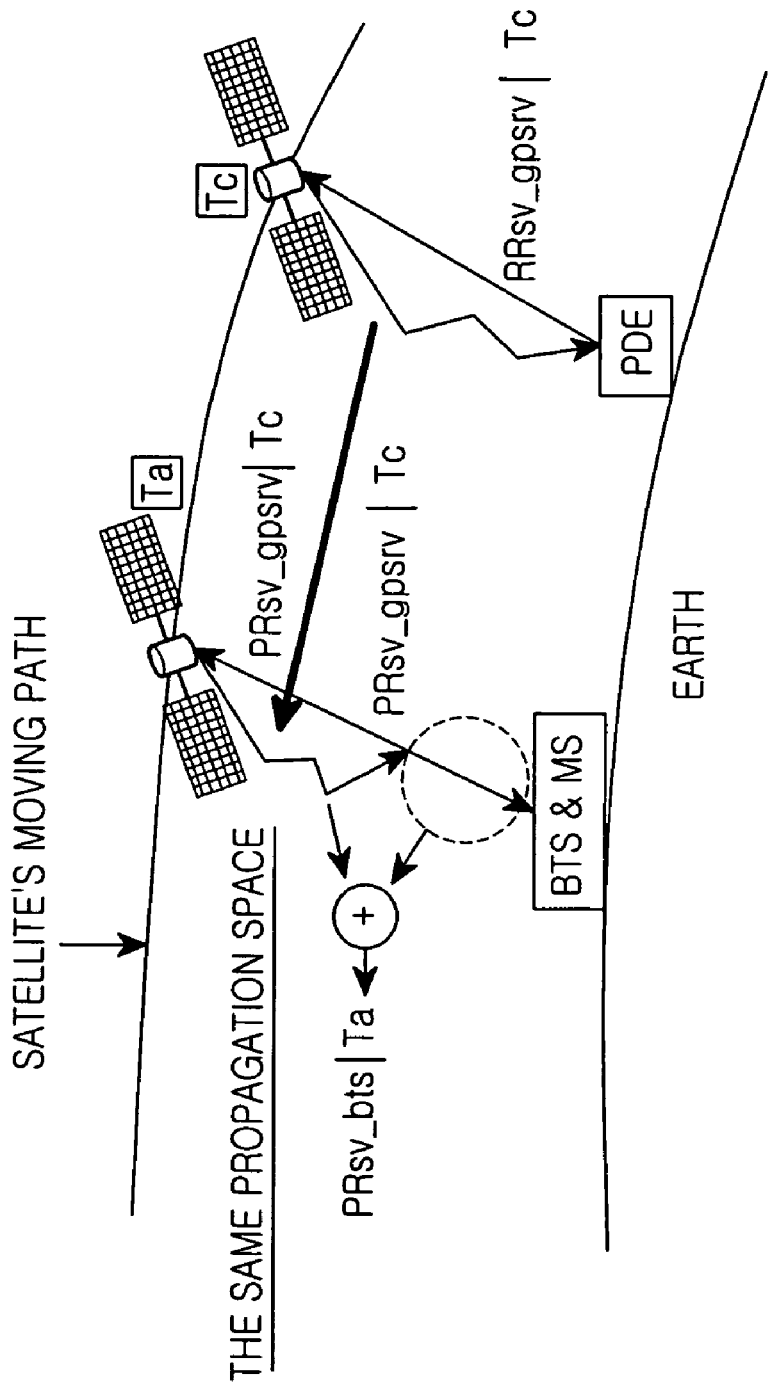
FIG. 7 is a conceptual diagram illustrating code phase information in accordance with a preferred embodiment of the present invention.

FIG. 6 shows a variety of abbreviations in accordance with a preferred embodiment of the present invention. FIG. 7 is a conceptual diagram illustrating code phase information in accordance with a preferred embodiment of the present invention.

Referring to FIGS. 4 to 7, a code phase between the MS 100 and the satellite at the time Ta at which the MS 100 searches for the GPS signal to determine its position is not configured in the form of a straight range (i.e., a straight distance) indicative of an ideal propagation path, and contains a propagation spatial delay. The straight range indicates a real range between the satellite and the BS 110 at the time Ta, and the range containing the propagation spatial delay indicates a pseudo range (PRsv_bts|Ta) between the satellite and the BS 110.

It is impossible to correctly recognize the propagation spatial delay at Ta, however, such that the propagation spatial delay can be estimated by a pseudo range which has been calculated using satellite orbital information received from the reference station GPS receiver 130 at the time Tc. In this case, the pseudo range is a range (i.e., a distance)

between the satellite and a predetermined station (a BS 110) at a specific time at which the station actually performs a position measurement operation. The real range is a straight range between the satellite and the station (a BS 110) at a specific time at which the reference station GPS receiver receives the satellite signal.

Figure 9:
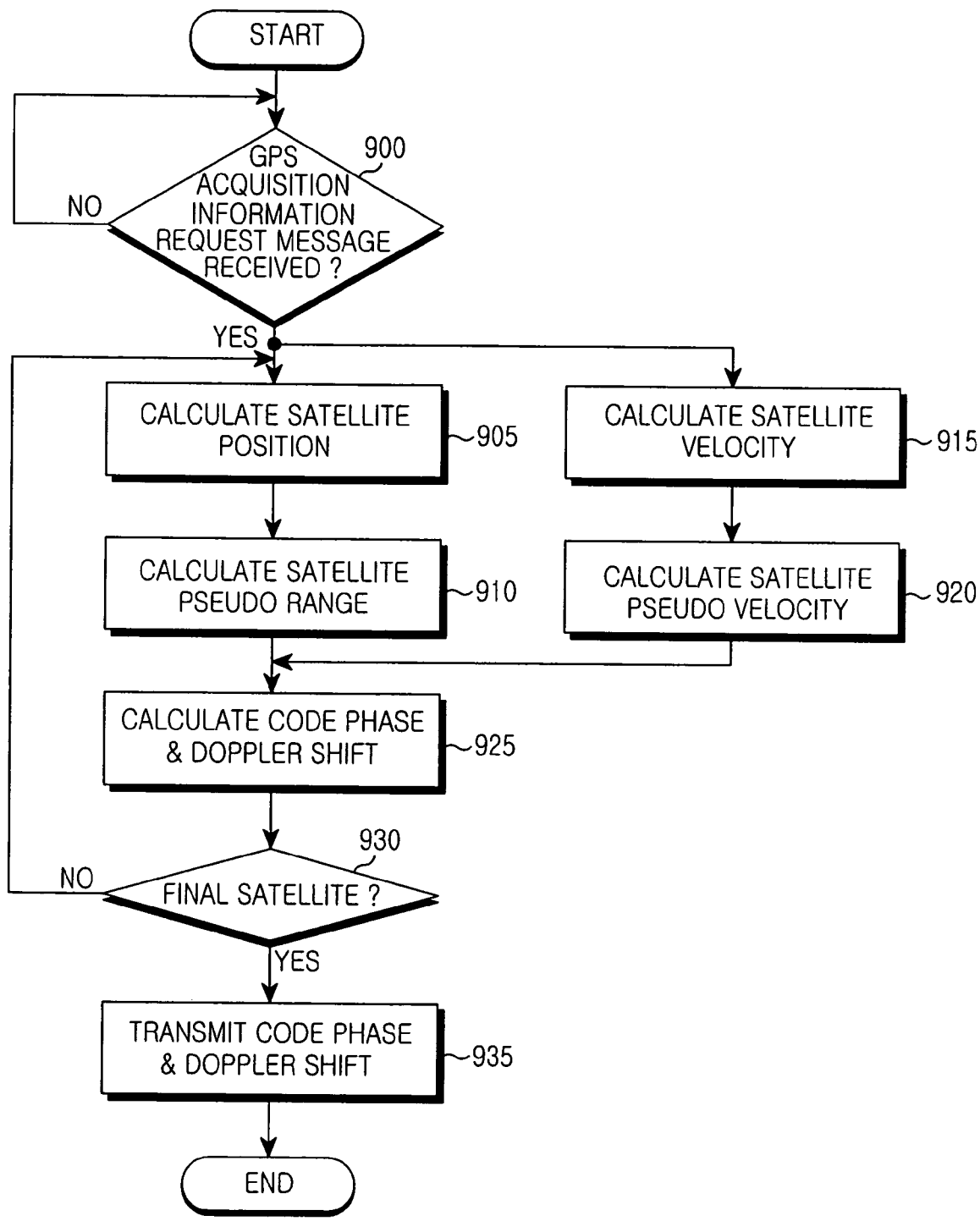
FIG. 9 is a flow chart illustrating a method for calculating a measurement parameter to determine an MS position in accordance with a preferred embodiment of the present invention.

If a real range RRsv_gpsrv|Tc between the satellite and the reference station GPS receiver 130 at the time Tc and a real range RRsv_bts|Ta between the satellite and the MS 100 at the time Ta is substituted for a pseudo range PRsv_gpsrv|Tc between the reference station GPS receiver 130 and the satellite at the time Tc, the pseudo range PRsv_bts|Ta at the time Ta can be acquired. The time difference between Ta and Tc is less than about 6 seconds even though it contains a processing time and a network delay time, and the satellite's movement observed on earth within 6 seconds is considered to be a very small amount of movement, such that the pseudo range PRsv_bts|Ta at the time Ta can be acquired using the aforementioned calculation method. In the case where the satellite signal originated from the satellite orbiting at an altitude of 2000 km is propagated to the reference station GPS receiver 130 and the MS 100, it can be assumed that the satellite signal passes over almost the same propagation space. The pseudo range PRsv_bts|Ta between the satellite and the MS 100 can be represented by the following Equation 12:

$$PRsv\_gpsrv|Tc = RRsv\_gpsrv|Tc + Error|Tc$$

$$PRsv\_bts|Ta = RRsv\_bts|Ta + Error|Ta \quad \text{[Equation 12]}$$

where Error|Tc and Error|Ta indicate the sum of propagation time delays caused by a variety of factors during a network transmission time. It can be assumed that the propagation signals at individual times Ta and Tc pass over the same propagation space, such that Error|Tc may be equal to Error|Ta in the above Equation 12. In case of eliminating Error|Tc and Error|Ta from Equation 12, the following Equation 13 can be created as follows:

$$PRsv\_bts|Ta = PRsv\_gpsrv|Tc + (RRsv\_bts|Ta - RRsv\_gpsrv|Tc) \quad \text{[Equation 13]}$$

where (RRsv_bts|Ta−RRsv_gpsrv|Tc) are indicative of a difference between the real range (between the satellite and the MS 100 at Ta) and the other real range (between the satellite and the reference station GPS receiver 130 at Tc) is shown in FIG. 9 in the form of a dotted circle in FIG. 7.

A method for calculating position and velocity information of a new or future satellite using a plurality of satellite orbital information (i.e., coordinate information) detected at more than three recent-consecutive times of the satellite will hereinafter be described.

The PDE 120 can calculate satellite coordinates ($x_a$, $y_a$, $z_a$) estimated at the time Ta upon receiving the coordinate information detected at more than three recent-consecutive times from the reference station GPS receiver 130. A method for calculating the satellite position coordinates at the time Ta can be represented by the following Equation 14:

$$v_x = (x2-x0)/(T2-T0)$$

$$v_y = (y2-y0)/(T2-T0)$$

$$v_z = (z2-z0)/(T2-T0)$$

$$A_x = (((x2-X1)/(T2-T1)) - ((x1-x0)/(T1-T0)))/(T1-T0)$$

$$A_y = (((y2-Y1)/(T2-T1)) - ((y1-y0)/(T1-T0)))/(T1-T0)$$

$$A_z = (((z2-Z1)/(T2-T1)) - ((z1-z0)/(T1-T0)))/(T1-T0)$$

$$x_a = x1 + v_x^*(T_a - T1)(Ax^*(T_a - T1)^*(T_a - T1)/2)$$

$$y_a = y1 + v_y^*(T_a - T1)(Ay^*(T_a - T1)^*(T_a - T1)/2)$$

$$z_a = z1 + v_z^*(T_a - T1)(Az^*(T_a - T1)^*(T_a - T1)/2) \quad \text{[Equation 14]}$$

where ($v_x$, $v_y$, $v_z$) is a satellite velocity between the time T0 two seconds prior of the satellite and the current time T2, and ($A_x$, $A_y$, $A_z$) is a satellite acceleration between the time T0 and the current time T2. A specific satellite positioned at Ta calculates position coordinates upon receipt of the satellite velocity and acceleration information and satellite position information one second prior.

Upon receiving the satellite position coordinate information detected at three consecutive times, the PDE 120 can calculate the satellite velocity ($v_{xa}$, $v_{ya}$, $v_{za}$) estimated at Ta using the following Equation 15:

$$v_{x1} = (x1-x0)/(T1-T0)$$

$$v_{y1} = (y1-y0)/(T1-T0)$$

$$v_{z1} = (z1-z0)/(T1-T0)$$

$$v_{x2} = (x2-x1)/(T2-T1)$$

$$v_{y2} = (y2-y1)/(T2-T1)$$

$$v_{z2} = (z2-z1)/(T2-T1)$$

$$v_{xa} = v_{x2} + ((v_{x2}-v_{x1})/(T2-T1))^*(T_a - T2)$$

$$v_{ya} = v_{y2} + ((v_{y2}-v_{y1})/(T2-T1))^*(T_a - T2)$$

$$v_{za} = v_{z2} + ((v_{z2}-v_{z1})/(T2-T1))^*(T_a - T2) \quad \text{[Equation 15]}$$

where ($v_{x1}$, $v_{y1}$, $v_{z1}$) is a satellite velocity at T1, ($v_{x2}$, $v_{y2}$, $v_{z2}$) is a satellite velocity at T2, and ($v_{xa}$, $v_{ya}$, $v_{za}$) is a satellite velocity at Ta. The satellite velocity at Ta can be calculated using satellite velocities and satellite coordinates at T1 and T2.

Figure 8:
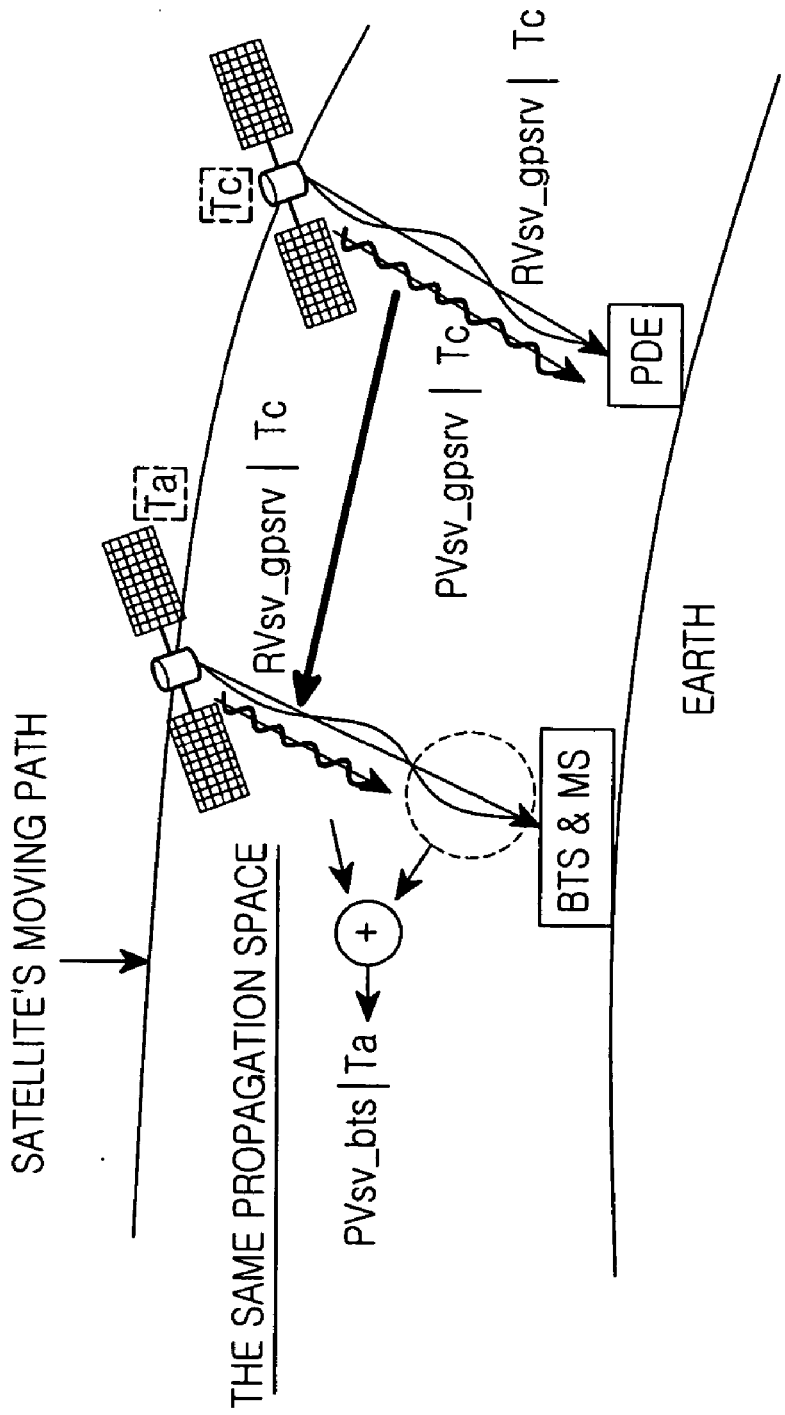
FIG. 8 is a conceptual diagram illustrating Doppler shift information in accordance with a preferred embodiment of the present invention.

Method for Calculating Code Phase and Doppler Shift Information using Position and Velocity Information of Satellite FIG. 8 is a conceptual diagram illustrating Doppler shift information in accordance with a preferred embodiment of the present invention. Referring to FIGS. 1, 4, 5, 6, 7 and 8, a pseudo range ρ considering a propagation delay between Ta times of the satellite and the MS 100 using Ta's satellite coordinates calculated by Equation 14 can be calculated using Equation 12. If vector coordinates at individual times Ta and Tc of the satellite are applied to Equation 12, the pseudo range ρ between the satellite and the MS 100 at Ta can be represented by the following Equation 16:

$$\rho( = PRsv\_bts | Ta) = PRsv\_gpsrv | Tc + \quad \text{[Equation 16]}$$

$$\left( \sqrt{(x_{Ta} - x_{BTS})^2 + (y_{Ta} - y_{BTS})^2 + (z_{Ta} - z_{BTS})^2} - \sqrt{(x_{Tc} - x_{GPSRV})^2 + (y_{Tc} - y_{GPSRV})^2 + (z_{Tc} - z_{GPSRV})^2} \right)$$

where ($x_{Ta}$, $y_{Ta}$, $z_{Ta}$) is satellite position coordinate information at Ta, ($x_{Tc}$, $y_{Tc}$, $z_{Tc}$) is satellite position coordinate information at Tc, ($x_{BTS}$, $y_{BTS}$, $z_{BTS}$) is position coordinate information of the BS 110, and ($x_{GPSRV}$, $y_{GPSRV}$, $z_{GPSRV}$) is position coordinate information of the reference station GPS receiver 130.

The pseudo range (ρ) calculated by the above Equation 16 is a parameter associated with a range or distance. If the pseudo range (ρ) is converted into a time-unit based pseudo range, the code phase (SV_CODE_PH) can be represented by the following Equation 17:

$$SV\_CODE\_PH = \text{floor}((\rho/C)*1000 - t*1023)$$

$$t = \text{floor}((\rho/C)*1000) \quad \text{[Equation 17]}$$

where floor(x) is a function indicative of the highest integer of less than an integer x, and t is created by converting the pseudo range ρ into a time-unit based pseudo range.

The PDE 120 calculates an inner product between an estimated satellite velocity vector ($v_{x\_Ta}$, $v_{y\_Ta}$, $v_{z\_Ta}$) and a unit vector of a vector directed from the satellite to the BS 110, such that it can acquire a component weighted on a straight line equal to the other straight line for connecting the BS 110 to the satellite from among the satellite velocity components having been calculated by Equation 14. In regard to the inner product result, the real satellite velocity at Ta (RVsv_bts|Ta:Real Velocity between SV and BTS at Time of Application) can be represented by the following Equation 18:

$$RVsv\_bts|Ta = \left( v_{x\_Ta} * \frac{(x_{BTS} - x_{Ta})}{\left(\sqrt{(x_{BTS} - x_{Ta})^2 + (y_{BTS} - y_{Ta})^2 + (z_{BTS} - z_{Ta})^2}\right)} + v_{y\_Ta} * \frac{(y_{BTS} - y_{Ta})}{\sqrt{(x_{BTS} - x_{Ta})^2 + (y_{BTS} - y_{Ta})^2 + (z_{BTS} - z_{Ta})^2}} + v_{z\_Ta} * \frac{(z_{BTS} - z_{Ta})}{\sqrt{(x_{BTS} - x_{Ta})^2 + (y_{BTS} - y_{Ta})^2 + (z_{BTS} - z_{Ta})^2}} \right)$$

[Equation 18]

The PDE 120 calculates an inner product between a finally-observed satellite velocity vector ($v_{x\_Tc}$, $v_{y\_Tc}$, $v_{z\_Tc}$) and a unit vector of a vector directed from the satellite to the reference station GPS receiver 130, such that it can acquire a component weighted on a straight line equal to the other straight line for connecting the reference station GPS receiver 130 to the satellite from among the satellite velocity component having been calculated by Equation 18. The real velocity (RVsv_gpsrv|Tc: Real Velocity between Sve and GPS Receiver at Time of Current) between the satellite and the reference station GPS receiver 130 can be represented by the following Equation 19 for calculating the real velocity between the satellite and the reference station GPS receiver 130 when there is no obstacle between the satellite and the reference station GPS receiver 130 at a specific time Tc:

$$RVsv\_gpsrv = v_{x_{Tc}} * \frac{x_{GPSRV} - x_{Tc}}{\sqrt{(x_{GPSRV} - x_{Tc})^2 + (y_{GPSRV} - y_{Tc})^2 + (z_{PSRV} - z_{Tc})^2}} + v_{y_{Tc}} * \frac{y_{GPSRV} - y_{Tc}}{\sqrt{(x_{GPSRV} - x_{Tc})^2 + (y_{GPSRV} - y_{Tc})^2 + (z_{PSRV} - z_{Tc})^2}} + v_{z_{Tc}} * \frac{z_{GPSRV} - z_{Tc}}{\sqrt{(x_{GPSRV} - x_{Tc})^2 + (y_{GPSRV} - y_{Tc})^2 + (z_{PSRV} - z_{Tc})^2}}$$

[Equation 19]

where a pseudo velocity of the satellite at Ta can be calculated using the same method as in the code phase (SV_CODE_PH). The satellite pseudo velocity at Tc (PVsv_gpsrv|Tc) and the other satellite pseudo velocity at Ta (PVsv_BTS|Ta) can be represented by the following Equation 20:

$$PVsv\_gpsrv|Tc = RVsv\_gpsrv|Tc + Error|Tc$$

$$PVsv\_bts|Ta = RVsv\_bts|Ta + Error|Ta \quad \text{[Equation 20]}$$

where Error|Tc and Error|Ta indicate the sum of propagation time delays caused by a variety of factors during a network transmission time. Because a short time difference between the two times Ta and Tc occurs during the brief period of time of about 6 seconds, it can be assumed that the propagation signals at individual times Ta and Tc pass over the same propagation space, such that Error|Tc can be equal to Error|Ta in the above Equation 20. In case of eliminating Error|Tc and Error|Ta from the Equation 20, the following Equation 21 can be created as follows:

$$PVsv\_bts|Ta = PVsv\_gpsrv|Tc + (PVsv\_bts|Ta - PVsv\_gpsrv|Tc) \quad \text{[Equation 21]}$$

If the satellite's vector coordinate information calculated by Equation 14 is substituted into the above Equation 21, a satellite pseudo velocity at Ta can be calculated using the following Equation 22:

$$DOPPLER0(=PVsv\_bts|Ta) = PVsv\_gpsrv|Tc + (RVsv\_bts|Ta - RVsv\_gpsrv|Tc)*1000*1575420000/C \quad \text{[Equation 22]}$$

where 1575420000 is the carrier frequency of the satellite.

In this case, the pseudo velocity is a velocity of a satellite signal transferred from the satellite to the station, and is generated considering the propagation delay created while the satellite signal passes through the ionosphere and the troposphere. The real velocity does not take into consideration such a propagation delay.

In order to acquire an acceleration component weighted on the same straight line equal to the other straight line for connecting the BS 110 to the satellite at the time Ta, the velocity information at a specific time Ta0 (=Ta) can be calculated using the following Equation 23:

$$RVsv\_bts | Ta0 = \left( v_{x\_Ta0} * \frac{(x_{BTS} - x_{Ta0})}{\sqrt{(x_{BTS} - x_{Ta0})^2 + (y_{BTS} - y_{Ta0})^2 + (z_{BTS} - z_{Ta0})^2}} + \right.$$
$$v_{y\_Ta0} * \frac{(y_{BTS} - y_{Ta0})}{\left(\sqrt{(x_{BTS} - x_{Ta0})^2 + (y_{BTS} - y_{Ta0})^2 + (z_{BTS} - z_{Ta0})^2}\right)} +$$
$$\left. v_{z\_Ta0} * \frac{(z_{BTS} - z_{Ta0})}{\sqrt{(x_{BTS} - x_{Ta0})^2 + (y_{BTS} - y_{Ta0})^2 + (z_{BTS} - z_{Ta0})^2}} \right)$$

[Equation 23]

In addition, the velocity information at a specific time Ta1 (=Ta0+1000 ms) after the lapse of a predetermined time starting from the time Ta can be calculated using the following Equation 24:

$$RVsv\_bts | Ta1 = \left( v_{x\_Ta1} * \frac{(x_{BTS} - x_{Ta1})}{\sqrt{(x_{BTS} - x_{Ta1})^2 + (y_{BTS} - y_{Ta1})^2 + (z_{BTS} - z_{Ta1})^2}} + \right.$$
$$v_{y\_Ta1} * \frac{(y_{BTS} - y_{Ta1})}{\sqrt{(x_{BTS} - x_{Ta1})^2 + (y_{BTS} - y_{Ta1})^2 + (z_{BTS} - z_{Ta1})^2}} +$$
$$\left. v_{z\_Ta1} * \frac{(z_{BTS} - z_{Ta1})}{\sqrt{(x_{BTS} - x_{Ta1})^2 + (y_{BTS} - y_{Ta1})^2 + (z_{BTS} - z_{Ta1})^2}} \right)$$

[Equation 24]

A velocity difference between two times Ta0 and Ta1 can be calculated using the above Equations 23 and 24. If the velocity difference between two times Ta0 and Ta1 is converted into a frequency value and the parameter "Doppler1" is then calculated, the following Equation 25 can be configured as follows:

$$\Delta Doppler = (RVsv\_bts|Ta1 - RVsv\_bts|Ta0) *1000*1575420000/C$$

[Equation 2]

FIG. 9 is a flow chart illustrating a method for calculating a measurement parameter to determine an MS position in accordance with a preferred embodiment of the present invention.

Referring to FIGS. 1 and 4 through 9, the reference station GPS receiver 130 receives coordinate information and coordinate extraction time of individual observable satellites every second, and transmits the received information to the satellite data collector 360, such that the satellite data collector 360 stores it therein.

If the interface 300 receives a satellite acquisition information request signal from the MS 100 at step 900, the satellite data collector 360 stores satellite orbital information detected at three consecutive times prior to the request message reception time from among transmission information of observable satellites. For example, the satellite data collector 360 stores satellite information detected at three times T2 (i.e., a current time), T1 (i.e., a time one second prior) and T0 (i.e., a time two seconds prior).

The satellite position calculator 310 calculates the position of a satellite acting as an MS's observation target upon receiving coordinate information and time data detected at three consecutive times of a first satellite from the satellite data collector 360 at step 905. The satellite position can be calculated using Equation 14.

The pseudo range calculator 320 calculates a pseudo range between the BS 110 communicating with the MS 100 and the satellite at step 910 using the calculated satellite position of the step 905. The pseudo range calculator 320 calculates the pseudo range between the BS 110 instead of the MS 100 and the satellite. Although the pseudo range calculator cannot recognize correct position information of the MS 100, it is considered that the MS 100 and the BS 110 are placed at almost the same position from the viewpoint of the satellite, such that the pseudo range calculator 320 calculates the pseudo range between the BS 110 and the satellite. The pseudo range between the BS 110 and the satellite can be calculated using Equation 16 at step 910.

The satellite velocity calculator 330 calculates the satellite velocity to be observed by the MS 100 upon receiving coordinates and time data of three consecutive times from the satellite data collector 360 at step 915. The satellite velocity can be calculated using Equation 15.

The pseudo velocity calculator 340 calculates a pseudo velocity using only a velocity component directed to the MS 100 from among a plurality of satellite velocity components of step 915 at step 920. Therefore, the satellite pseudo velocity can be calculated using Equations 19 and 20. The satellite pseudo velocity is calculated between the MS and each satellite observed by the MS at a position measurement time of the MS using the velocities of the satellites.

The acquisition information calculator 350 calculates a code phase upon receiving the calculated pseudo range from the pseudo range calculator 320 at step 925, and calculates Doppler shift information upon receiving the calculated pseudo velocity from the pseudo velocity calculator 340 at step 925. The acquisition information calculator 350 determines if the calculated code phase and Doppler shift information has been calculated for the last satellite from among a plurality of observable satellites. If the satellite is determined to be the last satellite, the acquisition information calculator 350 transmits the calculated code phase and Doppler shift information to the MS at step 935. Otherwise, the acquisition information calculator 350 calculates the code phase and the Doppler shift of the next satellite at steps 905 and 910, respectively.

FIGS. 10~12 are tables illustrating the comparison results between a simulation result of the present invention and the prior art. Referring to FIGS. 4 and 10~12, the PDE 120 receives satellite orbital information, satellite coordinates, satellite coordinate extraction times, pseudo ranges, and pseudo velocities of individual satellites from the reference station GPS receiver 130 every second. The PDE 120 stores the satellite data in the satellite data collector 360. The PDE 120 detects pseudo range and pseudo velocity information of individual satellites using a test MS sufficiently spaced apart from the PDE 130 at the same time as a specific time at which the satellite data is collected, and performs a predetermined process on the detected information. In this case, the straight distance between the BS 110 adjacent to the observed place and the PDE 120 is determined to be about 17 km.

Thereafter, the PDE 120 selects a variety of information from among its own collected data, and adapts the selected information as entry data of a predetermine simulation. In this case, the selected information is composed of orbital information of a freely-selected satellite assigned a specific number "21" and individual data indicative of satellite coordinates extraction times having their ends 0, 1, and 2 (e.g., 275340 seconds, 275341 seconds, and 275342 seconds). The PDE 120 estimates pseudo range and pseudo velocity information of the satellite after the lapse of 6 seconds (e.g., 275348 seconds). The estimated pseudo range and pseudo velocity information is compared with the observed pseudo range and pseudo velocity of the test MS after the lapse of 6 seconds.

In accordance with the preferred embodiment of the present invention, the PDE calculates a code phase (CODE_PH) and a pseudo range search window (CODE_PH_INT) using the estimated pseudo range, and calculates the Doppler shift (DOPPLER1) by estimating the estimated pseudo velocity (DOPPLER0), such that the final calculation result of the preferred embodiment of the present invention is compared with the calculation result of the prior art.

The preferred embodiment of present invention calculates three information units having been collected at three times (i.e., 275340 seconds, 275341 seconds, 275342 seconds) by the number 10000 of repeating times, and compares the time consumed for the calculation with a processing velocity of the prior art in such a way that it can acquire its desired processing speed.

In order to calculate the accuracy of parameters, the preferred embodiment of present invention calculates 100 information units from among overall information having been collected for every second at intervals of 10 seconds on the basis of 275340 seconds, and averages differences between the calculated result and observed values of individual times, such that the averaged result is determined to be a mean error.

FIG. 10 depicts the observed data of the test MS. FIG. 11 is a table illustrating the comparison result between the prior art's entry data and the present invention's entry data during the simulation process. FIG. 12 is a table illustrating the comparison result between the preferred embodiment of present invention and the prior art. As shown in the drawings, the number of data items to be managed by the prior art is 22, and the number of data items to be managed by the preferred embodiment of present invention is 19, such that the preferred embodiment of present invention can reduce the number of data items by about 14% compared to the prior art. An estimated pseudo range of the prior art is almost equal to those of the preferred embodiment of present invention. A difference between the observed pseudo range of the test MS and the estimated pseudo range in the preferred embodiment of present invention is less than that of the prior art. The mean error of the present invention is almost equal to that of the prior art. Although the preferred embodiment of present invention and the prior art have almost the same effect in association with a code phase, a pseudo velocity, and a Doppler shift, the preferred embodiment of present invention can reduce a processing time by about 82% compared to the prior art.

As apparent from the above description, the preferred embodiment of present invention can easily estimate satellite position and velocity information at a position measurement time of a terminal (i.e., MS) simultaneously with a small amount of satellite data, and can calculate code phase and Doppler shift information of a specific satellite expected to be really observed by the terminal in consideration of a propagation delay, differently from the prior art.

Furthermore, the preferred embodiment of present invention can reduce the time consumed for a position measurement operation of the MS in the case of using the PDE, such that it can reduce power consumption required for the MS's position measurement operation, and can provide a user with his or her current position information upon receipt of a request from the user.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for calculating satellite acquisition information for controlling a position determination entity (PDE) to determine a position of a mobile station (MS) in a network assisted GPS system, said PDE comprising:

a satellite data collector for collecting satellite orbital information and pseudo range between a satellite and at least one of a mobile station (MS) and a base station (BS) of more than three consecutive times from a plurality of satellites;

an interface for receiving a request message from an MS and requesting a calculation of satellite acquisition information;

a satellite position calculator for receiving the request for the calculation of satellite acquisition information from the interface and calculating satellite position information using satellite orbital information from the satellite data collector;

a pseudo range calculator for calculating a pseudo range using the calculated satellite position information from the satellite position calculator;

a satellite velocity calculator for receiving the request for the calculation of satellite acquisition information from the interface and calculating velocity of satellites relative to the Earth-Centered, Earth-Fixed (ECEF) coordinate system using the satellite orbital information;

a pseudo velocity calculator for calculating pseudo velocities between the MS and each satellite observed by the MS at a position measurement time of the MS using a velocity component directed to the MS from among a plurality of satellite velocity components; and a satellite acquisition information calculator for calculating a code phase using the pseudo range, and for calculating a Doppler shift using the pseudo velocity, and communicating the code phase and Doppler shift to the MS in response to the request message, wherein the PDE transmits reference time data and a time-dependent variation to the MS in order for correcting time difference, and wherein the PDE transmits a difference between the frequency variation generated at an estimated time and the time-dependent frequency variation to the MS when a frequency of the satellite is correctly fixed to a specific value, so that the MS calculates the final frequency using the difference between the frequency variation.

2. The apparatus as set forth in claim 1, wherein the pseudo range is estimated considering a propagation delay between each satellite observed by the MS and the MS.

3. The apparatus as set forth in claim 1, wherein the pseudo velocity is estimated considering a propagation delay between each satellite observed by the MS and the MS.

4. The apparatus as set forth in claim 1, wherein the satellite orbital information is comprised of satellite coordinates and a coordinate extraction time.

5. The apparatus as set forth in claim 1, wherein the satellite acquisition information calculator calculates a code phase between each satellite and the MS using the following equation:

$$SV\_CODE\_PH = \text{floor}((\rho/C)*1000 - t*1023)$$

$$t = \text{floor}((\rho/C)*1000)$$

where SV_CODE_PH is a code phase between the satellite and the MS, $\rho$ is a pseudo range, and C is the velocity of light.

6. The apparatus as set forth in claim 1, wherein the satellite acquisition information calculator calculates the Doppler shift containing both a frequency variation of the satellite signal at the time Ta at which the MS expects to search for the satellite signal and a differential value of the frequency variation.

7. The apparatus as set forth in claim 6, wherein the satellite acquisition information calculator calculates the frequency variation of the satellite signal received in the MS using the following equation:

$$DOPPLER0 (=PVsv\_bts|Ta) = PVsv\_gpsrv|Tc + (RVsv\_bts|Ta - RVsv\_gpsrv|Tc)*1000*1575420000/C$$

where DOPPLER0 is the frequency variation of the satellite signal, PVsv_bts|Ta is a pseudo velocity between the satellite and the MS at the time Ta, PVsv_gpsrv|Tc is a pseudo velocity between the satellite and the apparatus at the time Tc, (RVsv_bts|Ta−RVsv_gpsrv|Tc) is a difference between a real velocity of the satellite at the time Ta and a real velocity of the satellite at the time Tc.

8. The apparatus as set forth in claim 7, wherein the satellite acquisition information calculator calculates a differential value of the frequency variation of the satellite signal using the difference between the pseudo velocities of the times Ta0 and Ta1 by means of the following equation:

$$\Delta Doppler = (RVsv\_bts|Ta1 - RVsv\_bts|Ta0)*1000*1575420000/C$$

$$Doppler1 = \text{floor}(\Delta Doppler * 64)$$

where RVsv_bts|Ta0 is a real range between the satellite and the BS at the time Ta, RVsv_bts|Ta1 is a real range between the satellite and the BS at the time Ta1, C is a velocity of light, and Doppler1 is a differential value of the frequency variation of the satellite signal.

9. A method for calculating satellite acquisition information for controlling a position determination entity (PDE) to determine a position of a mobile station (MS) in a network assisted GPS system, the method comprising:

a) controlling a satellite data collector to collect satellite orbital information and pseudo range between a satellite and at least one of a mobile station (MS) and a base station (BS) of more than three consecutive times from a plurality of satellites;

b) receiving a request message from the MS and controlling a satellite velocity calculator to calculate a velocity of satellites relative to the Earth-Centered, Earth-Fixed (ECEF) coordinate system using the satellite orbital information from the satellite data collector;

c) controlling a pseudo velocity calculator to calculate pseudo velocities between the MS and the each satellite observed by the MS at a position measurement time of the MS using a velocity component directed to the MS from among a plurality of satellite velocity components;

d) controlling a satellite position calculator to calculate satellite position information using satellite orbital information from the satellite data collector;

e) controlling a pseudo range calculator to calculate a pseudo range using the calculated satellite position information from the satellite position calculator; and f) controlling a satellite acquisition calculator to calculate a code phase using the pseudo range, and calculate a Doppler shift using the pseudo velocity, and communicate the code phase and Doppler shift to the MS in response to the request message, wherein the PDE transmits reference time data and a time-dependent variation to the MS in order for correcting time difference, and wherein the PDE transmits a difference between the frequency variation generated at an estimated time and the time-dependent frequency variation to the MS when a frequency of the satellite is correctly fixed to a specific value so that the MS calculates the final frequency using the difference between the frequency variation.

10. The method as set forth in claim 9, wherein the pseudo range is estimated considering a propagation delay between the each satellite observed by the MS and the MS.

11. The method as set forth in claim 9, wherein the pseudo velocity is estimated considering a propagation delay between the each satellite observed by the MS and the MS.

12. The method as set forth in claim 9, wherein the satellite orbital information is comprised of satellite coordinates and a coordinate extraction time.

13. The method as set forth in claim 9, wherein the step (f) for calculating the satellite acquisition information comprises:

f1) calculating a code phase between the each satellite and the MS using the following equation:

$$SV\_CODE\_PH = \text{floor}((\rho/C)*1000 - t*1023)$$

$$t = \text{floor}((\rho/C)*1000)$$

where SV_CODE_PH is a code phase between the satellite and the MS, $\rho$ is a pseudo range, and C is the velocity of light.

14. The method as set forth in claim 9, wherein the step (f) for calculating the satellite acquisition information further comprises:

f2) calculating the Doppler shift containing both a frequency variation of the satellite signal at the time Ta at which the MS expects to search for the satellite signal and a differential value of the frequency variation.

15. The method as set forth in claim 14, wherein the step (f) for calculating the satellite acquisition information further comprises:

f3) calculating the frequency variation of the satellite signal received in the MS using the following equation:

$$DOPPLER0(=PVsv\_bts|Ta)=PVsv\_gpsrv|Tc+(RVsv\_bts|Ta-RVsv\_gpsrv|Tc)*1000*1575420000/C$$

where DOPPLER0 is the frequency variation of the satellite signal, $PVsv\_bts|Ta$ is a pseudo velocity between the satellite and the MS at the time Ta, $PVsv\_gpsrv|Tc$ is a pseudo velocity between the satellite and the apparatus at the time Tc, $(RVsv\_bts|Ta-RVsv\_gpsrv|Tc)$ is a difference between a real velocity of the satellite at the time Ta and a real velocity of the satellite at the time Tc.

16. The method as set forth in claim 15, wherein the step (f) for calculating the satellite acquisition information further comprises:

f4) calculating a differential value of the frequency variation of the satellite signal using the difference between the pseudo velocities of the times Ta and Ta1 by means of the following equation:

$$\Delta Doppler=(RVsv\_bts|Ta1-RVsv\_bts|Ta0)*1000*1575420000/C$$

$$Doppler1=\text{floor}(\Delta Doppler*64)$$

where $RVsv\_bts|Ta0$ is a real range between the satellite and the BS at the time Ta, $RVsv\_bts|Ta1$ is a real range between the satellite and the BS at the time Ta1, C is the velocity of light, and Doppler1 is a differential value of the frequency variation of the satellite signal.

* * * * *